US009100909B2

(12) United States Patent
Conte et al.

(10) Patent No.: US 9,100,909 B2
(45) Date of Patent: Aug. 4, 2015

(54) METHOD FOR MANAGING THE OPERATION OF A RADIO ACCESS POINT OF AN ACCESS NETWORK INFRASTRUCTURE OF A RADIO COMMUNICATION NETWORK

(75) Inventors: Alberto Conte, Nozay (FR); Brice Leclerc, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 530 days.

(21) Appl. No.: 13/145,168

(22) PCT Filed: Jan. 19, 2010

(86) PCT No.: PCT/FR2010/050081
§ 371 (c)(1),
(2), (4) Date: Jan. 11, 2012

(87) PCT Pub. No.: WO2010/084282
PCT Pub. Date: Jul. 29, 2010

(65) Prior Publication Data
US 2012/0115467 A1    May 10, 2012

(30) Foreign Application Priority Data

Jan. 20, 2009    (FR) .................................... 09 50329

(51) Int. Cl.
*H04W 74/00*    (2009.01)
*H04W 56/00*    (2009.01)
(Continued)

(52) U.S. Cl.
CPC ...... *H04W 56/0015* (2013.01); *H04W 52/0225* (2013.01); *H04W 76/02* (2013.01); *H04W 84/045* (2013.01); *H04W 92/20* (2013.01)

(58) Field of Classification Search
CPC .................... H04W 52/0225; H04W 56/0015; H04W 92/20; H04W 84/045; H04W 76/02; H04W 74/00; H04W 7/24
USPC ........... 455/434, 436, 444, 435.2, 450, 452.1, 455/509; 370/252, 315, 328–331, 350, 360, 370/522
See application file for complete search history.

(56) References Cited

U.S. PATENT DOCUMENTS 8,099,094 B2    1/2012    Marinier et al.
8,121,100 B2 *  2/2012    Robson et al. ................ 370/338
(Continued)

FOREIGN PATENT DOCUMENTS

CN    1989775 A      6/2007
CN    101044768 A    9/2007
(Continued)

OTHER PUBLICATIONS

English Bibliography for Japanese Patent Publication JP 2006174153A, filed Dec. 16, 2004, printed from Thomson Innovation on Dec. 17, 2012 (3 pages).
(Continued)

*Primary Examiner* — Khawar Iqbal
(74) *Attorney, Agent, or Firm* — Fay Sharpe LLP

(57) ABSTRACT

In a radio communication network access network infrastructure, comprising first and second access points into the access network infrastructure which are both capable of communicating over a radio interface with a user equipment, wherein the radio coverage of the first access point is at least partially included in the radio coverage of the second access point, and wherein the first access point is capable of operating in an operating mode wherein it does not transmit a pilot signal, the first access point synchronizes itself with the second access point during reception, and switches to the operating mode wherein it does not transmit a pilot signal.

21 Claims, 6 Drawing Sheets

(51) Int. Cl.
*H04W 52/02* (2009.01)
*H04W 76/02* (2009.01)
*H04W 84/04* (2009.01)
*H04W 92/20* (2009.01)

(56) References Cited

U.S. PATENT DOCUMENTS

| | | | |
|---|---|---|---|
| 8,135,427 B2* | 3/2012 | Muqattash et al. | 455/522 |
| 8,374,163 B2* | 2/2013 | Horn et al. | 370/347 |
| 2007/0066329 A1* | 3/2007 | Laroia et al. | 455/502 |
| 2007/0270152 A1 | 11/2007 | Nylander et al. | |
| 2008/0039011 A1* | 2/2008 | Chang et al. | 455/7 |
| 2008/0232286 A1 | 9/2008 | Habetha et al. | |
| 2009/0029645 A1* | 1/2009 | Leroudier | 455/7 |
| 2009/0082002 A1* | 3/2009 | Kim et al. | 455/418 |
| 2009/0122773 A1* | 5/2009 | Gogic | 370/338 |
| 2009/0290520 A1* | 11/2009 | Roberts et al. | 370/311 |
| 2009/0316654 A1* | 12/2009 | Prakash et al. | 370/331 |
| 2010/0067422 A1* | 3/2010 | Kadous et al. | 370/311 |
| 2010/0103860 A1* | 4/2010 | Kim et al. | 370/315 |
| 2010/0111047 A1* | 5/2010 | Yang et al. | 370/336 |
| 2010/0190499 A1* | 7/2010 | Wu | 455/436 |
| 2011/0034145 A1* | 2/2011 | Youn et al. | 455/404.1 |
| 2011/0085611 A1* | 4/2011 | Laroia et al. | 375/260 |
| 2011/0206009 A1* | 8/2011 | Attar et al. | 370/331 |
| 2011/0244792 A1* | 10/2011 | Park et al. | 455/39 |
| 2012/0295622 A1* | 11/2012 | Kazmi et al. | 455/436 |
| 2013/0308575 A1* | 11/2013 | Chen et al. | 370/329 |

FOREIGN PATENT DOCUMENTS

| | | |
|---|---|---|
| JP | 2006174153 A | 6/2006 |
| JP | 2007524304 A | 8/2007 |
| JP | 2007274208 A | 10/2007 |
| JP | 2007529915 A | 10/2007 |
| WO | WO 2004/075583 A1 | 9/2004 |
| WO | 2005062798 A2 | 7/2005 |
| WO | WO 2005/062798 A2 | 7/2005 |
| WO | 2005076545 A1 | 8/2005 |
| WO | 2007035447 A2 | 3/2007 |

OTHER PUBLICATIONS

English Abstract for Japanese Patent Publication JP 2006174153A, filed Dec. 16, 2004, Patent Abstract of Japan, printed from Japanese Patent Office on Dec. 17, 2012 (1 page).

English Bibliography for Japanese Patent Publication JP 2007274208A, filed Mar. 30, 2006, printed from Thomson Innovation on Apr. 17, 2013 (3 pages).

English Bibliography for Japanese Patent Publication JP 2007524304A, filed Feb. 4, 2005, printed from Thomson Innovation on Apr. 17, 2013 (6 pages).

International Search Report for PCT/FR2010/050081 dated Apr. 27, 2010.

English Bibliography for Chinese Patent Publication CN1989775A, published Jun. 27, 2007, printed from Thomson Innovation on Jan. 17, 2014 (6 pages).

English Bibliography for Chinese Patent Publication CN101044768A, published Sep. 26, 2007, printed from Thomson Innovation on Jan. 17, 2014 (5 pages).

English Bibliography for Japanese Patent Publication JP2007529915A, published Oct. 25, 2007, printed from Thomson Innovation on Mar. 13, 2014 (7 pages).

PCT Pat. App. No. PCT/FR2010/050081, Written Opinion of the International Searching Authority, mailed Apr. 27, 2010, 6 pp.

* cited by examiner

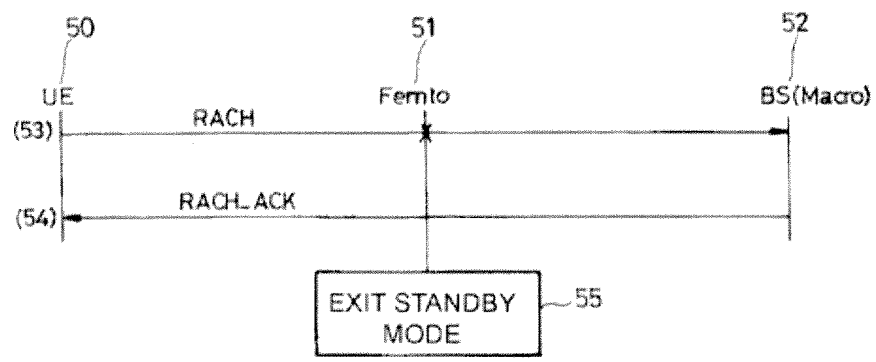
FIG_2a
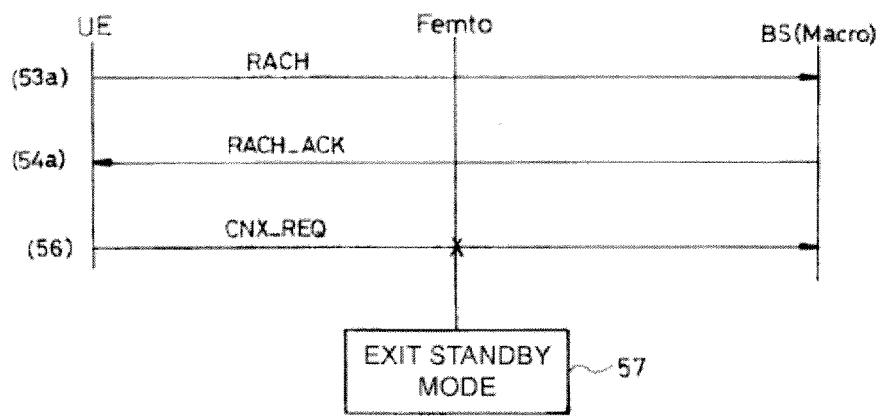
FIG_2b

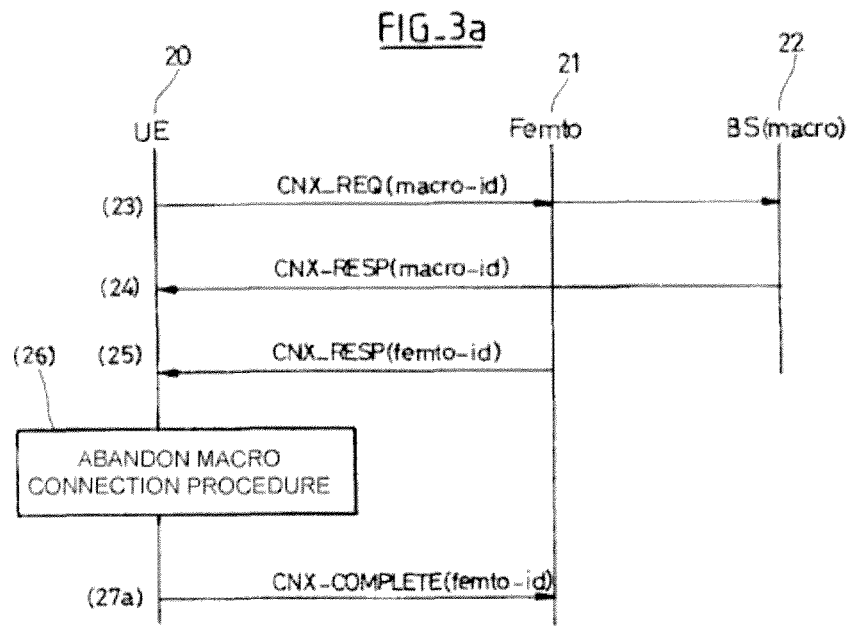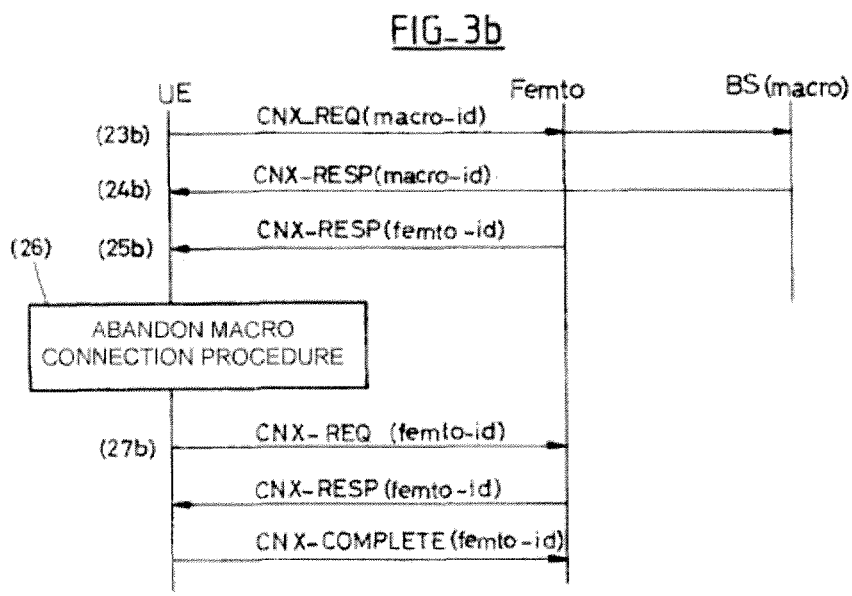

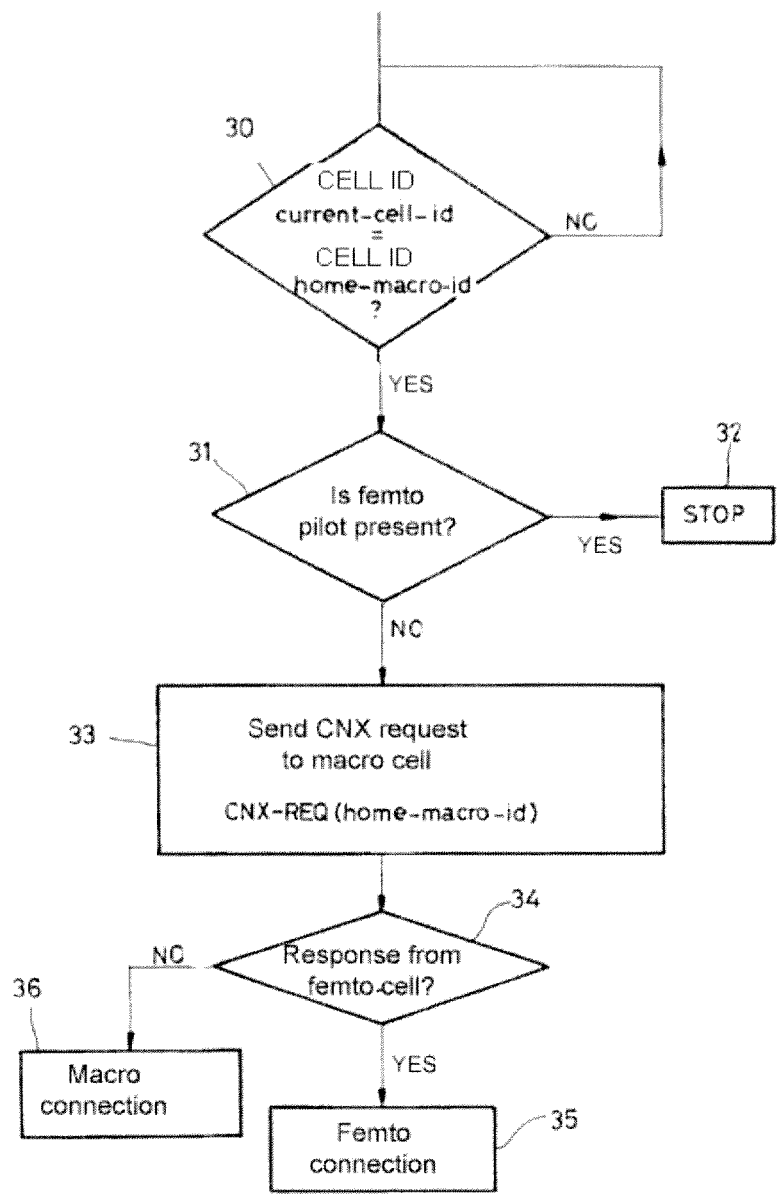

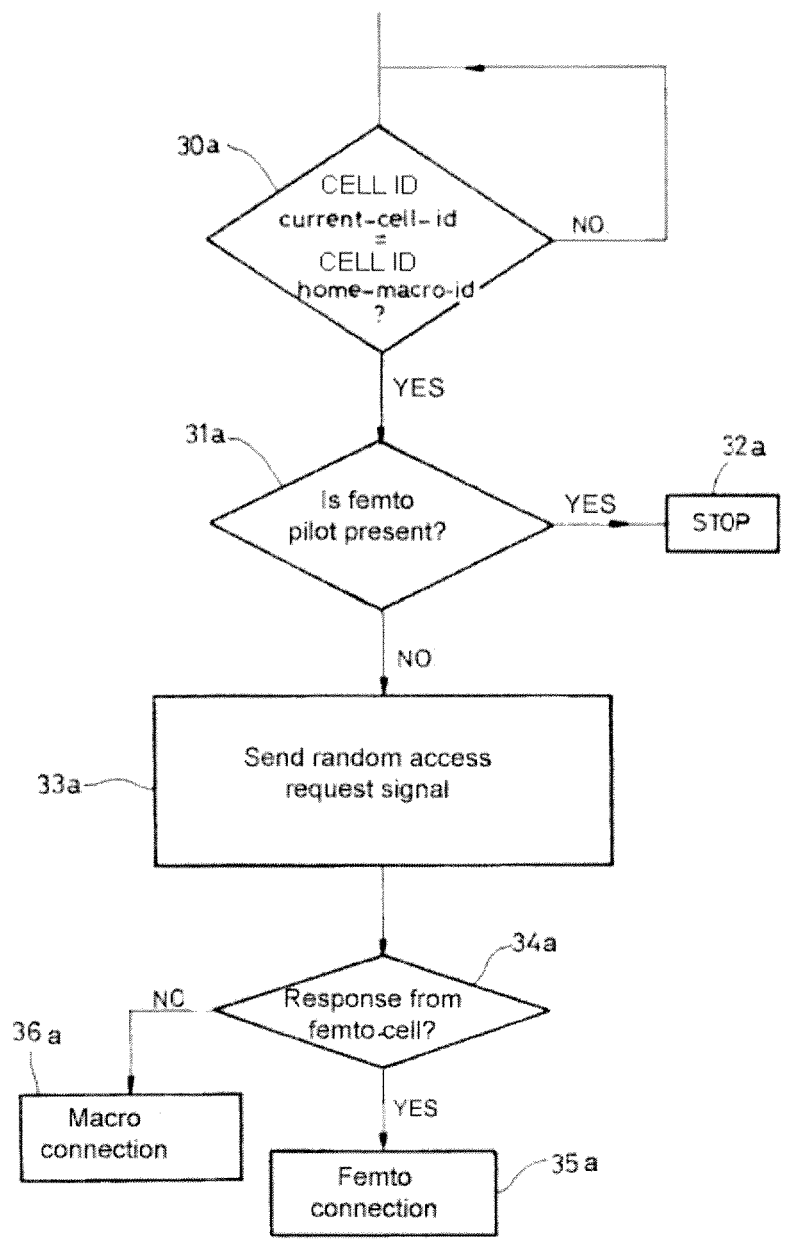

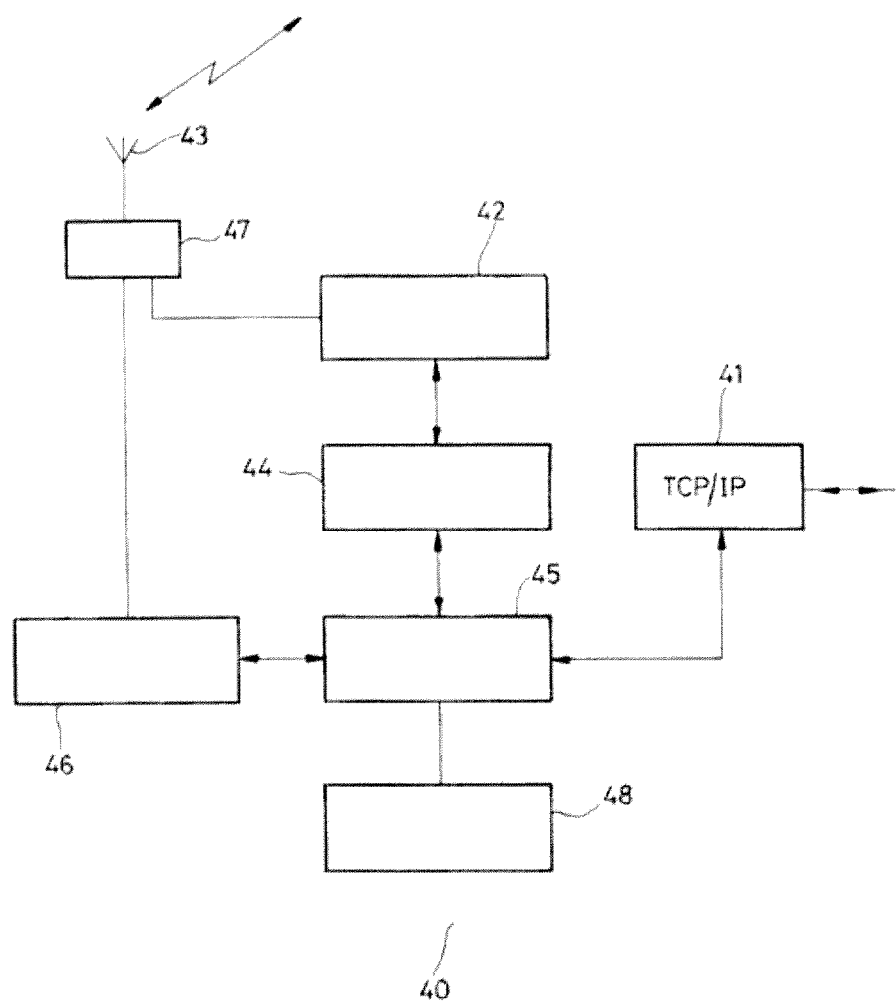

METHOD FOR MANAGING THE OPERATION OF A RADIO ACCESS POINT OF AN ACCESS NETWORK INFRASTRUCTURE OF A RADIO COMMUNICATION NETWORK

The present invention pertains to managing the operation of an access point of an access network infrastructure of a radio communication network. It pertains in particular to managing a standby operating mode of an access point of a radio communication network.

The recent development of the concept of broadband access in a residential setting has led to the emergence of new solutions designed to fulfill this need, particularly in the domain of wireless access. A net of recent solutions, collectively known by the common name "femto" or "residential gateway," particularly offer residential users access to high speed wireless transmissions. The femto solution typically provides a radio interface that complies with a third-generation radio communication standard, or an equivalent, and is inserted within an infrastructure of a corresponding radio access network. One example of this is provided by the femto access points that comply with the third-generation UMTS ("Universal Mobile Telecommunication System") standard, which are capable of communicating with user equipment over the radio interface in accordance with the over-the-air interface communications specifications for UMTS systems, and have a communication interface with a UMTS radio access network.

A femto access point typically consists of a small-size, low-power base station (or a base station router) capable of emitting and receiving radio signals in accordance with the radio interface specifications of a radio communication system, for example a cellular one, with which it is associated. It thereby makes it possible to extend the radio coverage of said system, by providing means for not only indoor coverage, but also home-scale radio coverage for home wireless broadband access. The "femto" appellation generally refers to the small size of the radio cell generated by these access points when they form a part of a cellular radio communication network, compared with the size of the radio cells generated by "conventional" base stations of a cellular radio communication system. The femto access point is also connected to a radio access network infrastructure of the cellular radio communication system with which it is associated by means of a broadband communication interface, generally of the same type as interfaces available in a residential setting, such as an ADSL line or a wired network interface.

As the femto access points are particularly intended for home use, they are not immune to the need shared with all electronic equipment, including consumer electronics, to limit power consumption. Defining a standby operating mode, in which an access point consumes less power than in normal operation, is therefore desirable. Such a mode is further characterized by the principles that govern the management of switching from normal mode to standby mode, and vice versa.

The invention thereby proposes a method for managing the operation of a radio access point of an access network infrastructure of a radio communication network, the access network infrastructure comprising first and second radio access points into the access network infrastructure both capable of communicating over a radio interface with a user equipment, wherein the radio coverage of the first radio access point is at least partially included in the radio coverage of the second radio access point, and wherein the first radio access point is capable of operating in an operating mode in which it does not transmit a pilot signal. The first radio access point synchronizes its reception with the second radio access point, and switches to the operating mode in which it does not transmit a pilot signal.

It is not necessary for the radio coverage of the first radio access point to substantially be fully included in the radio coverage of the second radio access point, although this situation is not excluded, as we shall see below in one particular embodiment.

In one embodiment, the first radio access point leaves the operating mode in which it is not transmitting a pilot signal subsequent to receiving a random access request signal, for example one transmitted by a user equipment to the second access point.

In another embodiment, the first radio access point leaves the operating mode in which it is not transmitting a pilot signal subsequent to receiving a connection setup request, which request may for example be intended for the second access point.

Advantageously, the first radio access point continues the connection setup procedure with the equipment that initiated the setup request.

The user equipment that initiated the setup request may also abandon the connection setup procedure with the second radio access point upon receiving a message indicating that the first access point is to pursue the connection setup procedure. It may also continue the connection setup procedure with the first access point, or initiate a new connection setup procedure with the first access point.

In one embodiment, the user equipment identifies the second radio access point before transmitting to that second access point a random request signal and/or a connection setup request.

The first access point's "standby" operating mode may be characterized by the halting of the radio signal transmission, which makes it possible to considerably reduce the power consumption of the first radio access point. This also makes it possible to limit the interference between radio access point cells, particularly in a configuration in which several femto radio access points are installed in a building. In this situation, the operating mode in which the first radio access point does not transmit a pilot signal is an operating mode in which the first radio access point does not transmit any signal, the first radio access point being capable of operating in this mode.

The invention may also be applied in the nonlimiting context of cellular radio communication networks, and in a situation in which the first radio access point is comprised within a home or "femto" access node, and the second radio access point is comprised within a base station of the access network infrastructure of the cellular radio communication network. However, it may also be applied to any other type of cellular radio communication network radio access point, serving one or more micro, pico, and/or macrocells. Finally, it may also be applied in networks and access points configured in such a way that the radio coverage of the first radio access point is substantially fully included in the radio coverage of the second access point. This may particularly be the case when the first access point is included within a femto access node and serves a "femto" cell (i.e. a small-sized cell, intended to ensure radio coverage in a residential setting), and that the second radio access point is included within a base station of a cellular radio communication system serving one or more "macro" cells.

Another aspect of the invention pertains to a device capable of communicating with an access network infrastructure of a radio communication network, comprising means of communicating over a radio interface with a user equipment of the access network infrastructure of a radio communication network, means for managing the operating mode configured to control the switchover to an operating mode in which the device does not transmit any pilot signals, and the departure from that operating mode, means of synchronization during reception with a radio access point of the access network infrastructure of a radio communication network, the radio coverage of the device being at least partially included in the radio coverage of said radio access point, and wherein said means of managing the operating mode are configured to switch the device to an operating mode in which it does not transmit a pilot signal after synchronizing during reception with said radio access point.

In one embodiment, said means for managing the operating mode are configured to remove the device from the operating mode in which it does not transmit a pilot signal subsequent to receiving a random access request signal.

In another embodiment, the device further comprises means for managing connection setup with a user equipment, and said means for managing the operating mode are configured to remove the device from the operating mode in which it does not transmit a pilot signal subsequent to receiving a connection setup request.

Said means of managing connection setup with a user equipment may also be configured to continue the connection setup procedure with the equipment that initiated the setup request.

This inventive device may advantageously be integrated into a home or "femto" radio access point, which may itself advantageously be integrated into a piece of equipment that may be used in a residential context, designated by the acronym CPE ("Customer Premises Equipment").

The invention finally proposes a computer program that may be loaded into a memory associated with a processor, and comprising instructions for implementing a method as defined below when said program is executed by the processor, as well as a data-processing medium on which said program is stored.

Other particularities and advantages of the present invention will become apparent in the description below of non-limiting example embodiments, with reference to the attached drawings, in which:

FIGS. 2a and 2b are diagrams showing the steps for leaving the standby mode of an access point according to a first embodiment;

FIGS. 3a and 3b are diagrams showing the steps for leaving the standby mode of an access point according to a second embodiment;

FIGS. 4a and 4b are diagrams showing the steps for leaving the standby mode of an access point according to a third embodiment;

FIG. 5 is a synoptic diagram of a device according to the invention.

Figure 1:
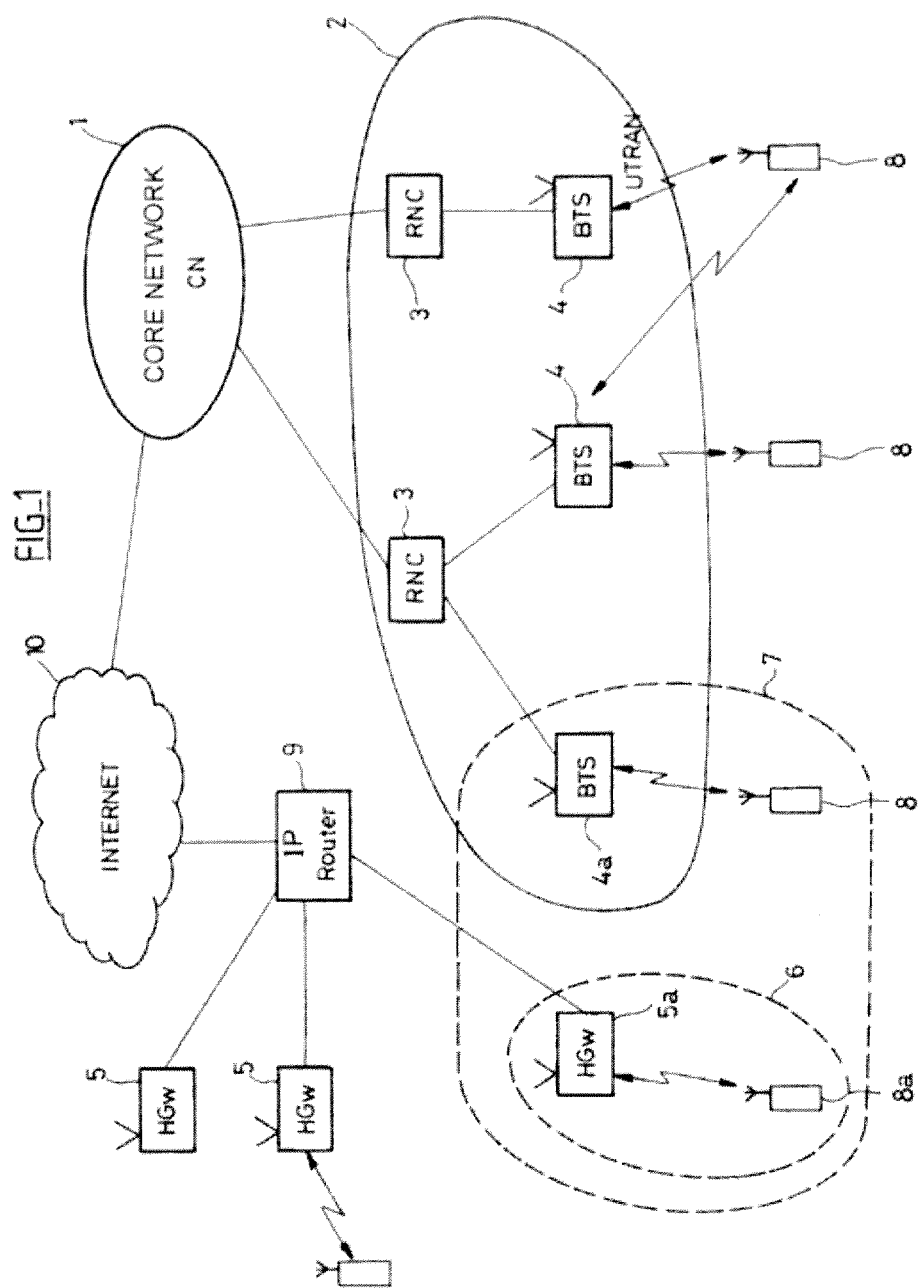
FIG. 1 shows an architecture diagram of a UMTS system.

The present description assumes the non-limiting case of a femto access point comprised within an access network of a UMTS cellular radio communication network in FDD ("Frequency Division Duplex") mode.

FIG. 1 shows a cellular radio communication network comprising an access network infrastructure of the UMTS type including femto access points. UMTS is a radio communication system whose access network, known as UTRAN ("UMTS Terrestrial Radio Access Network"), uses code division multiple access (CDMA), meeting that the transmitted symbols are multiplied by spread-spectrum codes made up of samples known as "chips" whose transmission rate is greater than that of the transmitted symbols. The spread-spectrum codes distinguish different physical channels PhCH, which overlap on the same transmission resource constituted by a carrier frequency. The self- and cross-correlation properties of the spread-spectrum codes allow the receiver to separate the PhCHs and to extract the symbols that are intended for them.

The UMTS cellular radio communication network comprises a core network (CN) 1 comprising interconnected switches known as MSCs for those which provide circuit-switching services, and SGSNs for those which provide packet-switching services. In the radio access network 2, commonly known as UTRAN in the case of the UMTS, radio network controllers RNCs 3 are connected to switches of the core network. Each RNC monitors one or more base stations 4, known as Node-B, by means of an interface designated by the acronym IuB in the UMTS specifications. The Node-Bs are geographically distributed in such a way as to provide the desired radio coverage, and each Node-B serves one or more radio cells 7 covering the area in which the cellular service is accessible to the public.

For the UMTS in FDD mode on the downlink (from the UTRAN to the UEs), a primary scrambling code is allocated to each base station, and various physical channels used by that base station are distinguished by mutually orthogonal "channeling" channels. For each PhCH, the overall spread-spectrum code is the product of the base station's "channeling" and "scrambling" codes. The different physical channels, comprising shared channels and dedicated channels, abide by a frame structure in which frames that are each 10 ms succeed one another on the carrier frequency used by the base station. Each frame is subdivided into 15 timeslots (or "slots") of that are 666 µs each.

Among the different physical channels shared in the downlink direction, there is a pilot channel (CPICH, "Common Pilot Channel"), a primary control channel (P-CCPCH, "Primary Common Control Physical Channel"), a secondary control channel (S-CCPCH, "Secondary Common Control Physical Channel", a synchronization channel (SCH, "Synchronisation Channel"). The synchronization channel is used to search for the cell, and is made up of two subchannels: the primary SCH channel, and the secondary SCH channel. The primary SCH channel carries a piece of synchronization information consisting of a primary synchronization code (PSCs), and the secondary SCH channel carries a piece of synchronization information consisting of a set of secondary synchronization codes (SSCs).

Femto access points 5 distributed within the radio coverage area of the Node-Bs 4 define small-size radio coverage areas 6 which are, if not totally, then at least almost totally included in one or more radio cells served by the Node-Bs 4. The radio coverage 6 of a femto access point 5 is fairly low, typically on the order of about 10 m. The femto access point 5 may, for example, consist of an independent piece of equipment, preferentially one with a low form factor, intended to be installed in a residential setting, or in an onboard radio access module within a "gateway" piece of equipment further comprising a television signal decoder, WiFi access, Ethernet access, an ADSL modem, etc. In the nonlimiting examples in question, the radio coverage of a femto access point 5 of the UTRAN radio access network 2 is also a cell, of small size, for example one whose dimensions make it possible to cover a residential home. The cell 6 of a femto access point, commonly known as a "femtocell", is typically enclosed, either entirely or nearly so, in one or more cells 7 of Node-Bs 4, commonly known as "macrocells".

The BTSs 4 and femto access points 5 are capable of communicating on the radio communication interface with the mobile stations 8, 8a, also known as UEs ("User Equipment") in accordance with the corresponding specifications of the UMTS system. To do so, the femto access point 5 comprises a radio transmission module and a radio reception module.

A femto access point 5 further comprises a high-speed transmission line, such as one using a DSL interface, to the Internet 6, by means of an IP router 9. This makes it possible to connect the entire network of femto access points 5 with the rest of the UTRAN infrastructure 2 and the core network 1.

Each UE 8, 8a may be in one or more link states with the UTRAN, as managed by a radio resource control (RRC) protocol implemented within the RNC and within the UE (see 3G technical specification TS 25.331, "Radio Resource Control (RRC)"; Protocol Specification (Release 7)", version 7.10.0 published in September 2008 by the 3GPP (3rd Generation Partnership Project), section 7). In some of these states, the UE is in active connection with the radio communication system, which particularly means that it can send radio signals to the base station relating to a communication that is underway.

When the UE is powered on and within a selected cell without having any communication underway with the UTRAN, it is in a standby state. The initial cell selection and reselection processes are described in 3G technical specification TS 25.304, version 3.6.0 published in March 2001 by the 3GPP, section 5.2. In this standby state, after having selected a cell, the UE receives the system information emitted over a broadcast channel (BCH) by the selected cell base station (see the aforementioned technical specification 3G TS 25.331, section 8.1.1). This system information includes access control information in the uplink direction (from the UE to the UTRAN), as well as information related to the random access procedure on the physical layer. The control information to be broadcast on the BCH is carried by the physical channel P-CCPCH.

The femto access point 5 is capable of operating in a so-called standby mode, in which it emits no pilot signal. It may be provided, in another embodiment, that the femto access point 5 is no longer emitting any corresponding signal to its shared physical channels in the downlink direction. Finally, it may also be provided that the radio transmission module of the femto access point 5 is totally inactive when the access point is in standby node, such that it is no longer transmitting a signal, and particularly no more pilot signal. In these three situations, a UE 8 that is located within the coverage area of a macrocell 6 of the Node-B 4a and the femtocell of the femto access point 5a will not be able to access the UTRAN network 2 by means of the femto access point 5. It will, however, be able to access the UTRAN network 2 thanks to the information received from the signals transmitted by the Node-B 4a, signals which include the synchronization signals.

The femto access point 5 further comprises a module to manage the operating mode, which determines how to switch to standby operating mode, and how to leave that. Before switching to standby mode, the femto access point 5a synchronizes during reception from the Node-B 4a, which is one of the Node-Bs that serves a macrocell 7 within whose coverage area the femto access point 5a is located. This synchronization during reception comprises the acquisition of reception parameters from the Node-B 4a, so as to enable the femto access point 5a to intercept any access request made by a user equipment that falls within its radio coverage 6 intended for Node-B 4a. Within the context of the present description based on the nonlimiting example of a UMTS network, the synchronization may be conducted in accordance with the three-phase procedure 3 implemented by a user equipment when it is powered on to search for an initial cell. In a first phase, the femto access point 5a uses the properties of the primary SCH channel of the cell 7 in order to synchronize at the slot level. In a second phase, the femto access point 5a uses the properties of the secondary SCH channel of the cell 7 in order to synchronize on the frame level, and in a third phase, the femto access point 5a uses the properties of the CPICH channel of the cell 7 in order to deduce its primary scrambling code from it.

The femto access point 5a uses this primary scrambling code in order to access the system information broadcast on the P-CCPCH channel of the cell 7, and particularly to access the structure of the shared channels that a user equipment must use when establishing a call.

In order to initialize a communication, or more generally to transmit information to the UTRAN in standby mode, the UE 8a transmits to the selected base station a random access request signal on a shared channel known as PRACH ("Physical Random Access Channel").

This random access procedure is executed by the physical layer (see 3G technical specification TS 25.214, version 5.4.0, section 6, under the control of the medium access control layer MAC (see 3G technical specification TS 25.321, version 7.10.0, published in September 2008 by the 3GPP, section 11.2) and the RRC layer.

Thus, when the UE 8a wishes to begin a communication, or more generally to transmit information to the UTRAN 2, it performs a random access to the UTRAN 2, which is received by the Node-B 4a. Upon receiving an access authorization, it transmits to the Node-B 4a a connection setup request in accordance with the specifications of the radio resource control RRC UMTS protocol. This connection setup request is carried by a message (message RRC-CNX-REQ(macro_id)) of the RRC protocol whose characteristics are described in the aforementioned 3G technical specification TS 25.331.

When the UE 8a is within the radio coverage of the femto access point 5a, owing to the fact that the femto access point 5a synchronizes its reception with the Node-B 4a before switching to standby mode, the femto access point 5a can intercept the random access request sent by the UE 8a to the UTRAN 2, and particularly the RRC connection setup request message RRC-CNX-REQ(macro_id) sent by the UE 8a, and is able to react to it.

In a first embodiment, the femto access point 5a exits standby mode as soon as it intercepts a random access attempt from the UE 8a transmitted to the UTRAN 2. Standby mode may be exited once a random access request signal is intercepted, or when a connection setup request message is intercepted, with either one coming from a user equipment located within its radio coverage area. These two situations constitute examples of messages received by the femto access point 5a, and triggering its exit from standby mode, and therefore interpreted as "wake-up" messages. The departure from standby mode shall comprise the resumed transmission of signals/channels whose transmission was interrupted when standby mode was imposed. It may be the resumption of transmission by the radio module of the femto access point, or in the other situation described above, resuming the transmission of the pilot channel, or all the signals corresponding to its shared physical channels in the downlink direction.

In one variant, the femto access point 5a does not leave the standby mode until after having checked that the UE 8a from which such a wake-up message originated is one of the user equipments belonging to a predefined set of user equipments authorized for that femto access point 5a.

FIG. 2a illustrates different steps of the method for exiting standby mode according to this first embodiment. The user equipment 50 sends a random access request signal (RACH) to the base station 52 serving the macrocell within the coverage area it is found in. This random access request signal, initially transmitted to the base station 52, is intercepted by the femto access point 51 even though it is in standby mode. It should be noted that the femto access point 51 had synchronized its reception with the base station 52 before switching to standby mode. Upon the interception of the random access request signal initially transmitted to the base station 52. The femto access point 51 exits from standby mode (55).

FIG. 2b illustrates one variant of the method described above, wherein the femto access point only exits from standby mode (57) after the interception of a connection-opening request message (56).

In a second embodiment, the femto access point 5a responds to the access request from the UE 8a to the Node-B 4a. In the example chosen for the present description which is that of a UMTS system, the response from the femto access point 5a may, for example, comprise the sending by said femto access point 5a of a response message to said RRC connection setup request in accordance with the specifications of the RRC protocol. This RRC response message, of the CNX-RESP type contains, just as with the RRC connection request message, a cell identifier, which in these circumstances may be the cell identifier of the macrocell 7 corresponding to Node-B 4a, or the cell identifier of the femtocell 6 corresponding to the femto access point 5a.

In the event that the UE 8a receives the response to its access request coming from the femto access point 5a before the one coming from Node-B 4a, it may ignore the response coming from Node-B 4a that arrives there after the response from the femto access point 5a. In this situation, the UE 8a operates in a mode known as "compressed mode", in which it listens to the information coming from the femtocell of the femto access point 5a, as well as the information coming from the macrocell of Node-B 4a, "Compressed mode" is described in the specification 25.212 see technical specification 3GPP TS 25.212, "Multiplexing and channel coding (FDD) (Release 7)", version 7.9.0, published in September 2008 by the 3GPP, section 4.4.

Conversely, in the event that the UE 8a receives the response to its access request coming from the femto access point 5a after the one from Node-B 4a, it may ignore the response that came from the central access point 5a which reached it after the one from Node-B 4a.

In both of these situations, the femto access point 5a is removed from standby mode after having received the connection setup request that the UE 8a had initially transmitted to the Node-B 4a.

FIG. 3a illustrates different steps of the method for exiting standby mode according to this second embodiment. The user equipment 20 sends a connection-opening request message containing, among other things, an identifier of the macrocell within the coverage area in which it is located (it may also be an identifier of a base station 22 serving that cell) CNX_REQ (macro_id) 23. This connection-opening request message, initially intended for the base station 22, is intercepted by the femto access point 21 even though it is in standby mode. It should be noted that the femto access point 21 became synchronized in reception with the base station 22 before switching to standby mode. In step 24, the base station 22 sends a response to the connection-opening request message sent during step 23. This response message CNX_RESP(macro_id) contains, among other things, an identifier of a cell or base station 22. In step 25, the base station's 24 femto access point 21 sends a response to the connection-opening request message sent during step 23. This CNX_RESP(femto_id) response message contains, among other things, an identifier of a femtocell or the femto access point 21. Once the user equipment 20 has received a response from the femto access point, it may choose to abandon the connection setup procedure with the base station 22 by not continuing to send messages relating to that procedure, a step which is illustrated in FIG. 3a (26). However, the user equipment 20 does continue the connection setup procedure initially begun with the base station 22, not with that same station, but rather with the femto access point 21. Thus, in step 27, it sends a CNX_COMPLETE(femto_id) connection setup message to the femto access point 21, a message which no longer contains an identifier related to the base station 22 or one of the macrocells that that base station serves, but rather an identifier related to the femto access point 21, in order to confirm the setup of a connection with the femto access point 21.

In one variant, depicted in FIG. 3b, the user equipment 20 does not continue the connection setup procedure initially begun with the base station 22, but rather initiates a new connection setup procedure with the femto access point 21. Thus, during step 27b, it sends a CNX_REQ (femto_id) connection setup request message to the femto access point 21. This message launches a connection setup procedure with the femto access point once the user equipment has been informed, as a result of receiving the response message (25b) to its initial connection request (23b) with the base station 22, that the femto access point 21 has exited from standby mode.

It should also be noted that the length of time until the base station's 22 response to the initial connection setup request message 23 is received, or even the failure to receive a response from the base station 22, has no effect on the remainder of the described procedure provided that the user equipment 20 has received a response to its message initially addressed to the base station 22. This response informs it that the femto access point 21, if it had been in standby mode when the user equipment 20 sent its connection setup request message 23, has left that standby mode.

In a third embodiment, we consider a set of UEs, abbreviated $\{UE_i\}$, which are associated with the femto access point 5a. It may, for example, be user equipment of a set of authorized users of the femto access point 5a, meaning those who are permitted to use the femto access point 5a. This authorization may be permanent, or temporary, in order to serve one-time needs. The user equipments $\{UE_i\}$ have an identifier of the femto access point 5a and an identifier of the macrocell 7 served by Node-B 4a, within whose coverage area the femto access point 5a is located. For example, in the event of a residential usage in which a user has purchased or leased the femto access point 5a for his or her home, his or her user equipment $UE_k$ 8a has an identifier of the femto access point 5a (Id_Femto_5a) and of the macrocell 7 served by Node-B 4a (Id_Cell_Macro_NodeB4a).

The user equipment $UE_k$ 8a uses the data received on the pilot channel broadcast by the base station within whose radio coverage area it is located, which include the macrocell identifier, in order to compare the broadcast cell identifier against the identifier of "its" macrocell 7 (Id_Cell_Macro_NodeB4a).

Once it recognizes that the macrocell within whose coverage area it is located is "its" macrocell, meaning the macrocell 7 within whose coverage area the femto access point 5a with which it is associated is located, and that it is not receiving the pilot signal from said femto access point 5a, it may send a random access request signal, potentially followed by a connection setup message if random access is permitted, to Node-B 4a serving "its" macrocell 7. This message, if intercepted by the femto access point 5a will act as the standby mode exit request message for that femto access point 5a in accordance with the method described above in its different variants.

This procedure is illustrated by FIG. 4. In a first step 30, the user equipment conduct a test in order to tell whether the macrocell within whose coverage area it is located is indeed "its" own macrocell. This task may comprise a comparison between the identifier of the macrocell within whose coverage area it is located "current_cell_id" and the cell identifier of "its" macrocell "home_macro_id". The next step 31 is conducted if the previous step is positive, meaning if the user equipment recognized that it is located within the radio coverage area of "its" macrocell. Otherwise, the previous test is repeated, for example periodically. During step 31, the user equipment tests the presence of the pilot signal of "its" femto access point. If it receives that point's pilot signal, this means that it is not in standby mode. If this happens, there is no reason to continue the procedure of removing the femto access point from standby mode (step 32). Otherwise, the user equipment may be within the coverage area of its femto access point which is in standby mode, or it may be outside the radio coverage area of its femto access point, which may or may not be in standby mode. During step 33, it sends a connection setup request message to "its" macrocell. During step 34, it then tests whether or not "its" femto access point is receiving. If that femto access point responds (step 35), the user equipment may perform the setup of a connection with its femto access point, for example according to one of the procedures described above. In the event of a non-response from the femto access point (step 36), the user equipment may continue its connection setup procedure with "its" macrocell.

During step 33, the user equipment $UE_k$ may also, in one variant, transmit a connection setup request to "its" femto access point, and not to the Node-B serving "its" macrocell.

FIG. 4b illustrates one variant of the method described above, wherein steps 30a, 31a and 32a are identical to steps 30, 31 and 32. During step 33a, the user equipment transmits a random access request signal to "its" macrocell. During step 34, it then tests whether or not "its" femto access point is present. If that femto access point has exited standby mode, it transmits all of the control signals, which include its synchronization signal and its pilot signal, thereby enabling the user equipment to detect whether or not it is in standby mode. In this situation (step 35a), the user equipment may perform the setup of a connection with its femto access point, for example according to one of the procedures described above. In the event of a non-response from the femto access point (step 36a), the user equipment may begin a connection setup procedure with "its" macrocell.

It should be noted that the procedure described above enabling the user equipment to identify the macrocell within whose radio coverage area it is located, in order to determine whether that macrocell corresponds to a predetermined cell, may further advantageously comprise a procedure for authenticating that predetermined cell, without departing from the scope of the present invention.

FIG. 5 schematically depicts an example embodiment of an inventive device. The device 40 comprises a network interface (TCP/IP) 41 through which it communicates with an access network infrastructure of a radio communication network, a radio module 42 and a processing module 44. The controller 45 monitors the operations of the device 40, and in particular the operations of the radio 42 and processing modules 44, as well as the data exchanges over the external interface 41. The radio module 42 is also connected to antenna means 43 by way of a duplexer 47 for communications with user equipments (UE) on the over-the-air interface. The radio module 42 comprises a radio stage that receives the radio signals captured by the entire 43, and transposes them to a lower frequency. The received signals are then transmitted to a reception module (not depicted in the figure) of the radio module 42, in order to be treated (reformatting filter and analog-digital conversion) in a manner known per se. The module 44, connected to the radio module 42, processes the decoded information from the broadcast channels of a radio access point of a radio communication network's access network, which makes it possible to synchronize the device 40 during reception with a radio access point of said infrastructure.

The device 40 further comprises a radio signal transmission module 46 operating through the duplexer 47 and antenna means 43. The controller monitors the operations of that transmission module 46. A standby mode management module 48, meanwhile, monitors the switchover to standby mode and departure from said mode. When the process of switching to standby mode is triggered, the module 48, via the controller 45, commands the modules 42 and 44 to have the device 40 synchronize during reception with a radio access point of the access network infrastructure of a radio communication network. Once synchronization during reception has been carried out, the module 48 commands the transmission module 46, via the controller 45, to interrupt the transmission of the pilot signal, or to interrupt the operation of that module and stop all transmission, at least temporarily.

The invention claimed is:

1. A method for managing operation of a radio access point in an access network infrastructure of a radio communication network, the method comprising:
    synchronizing reception of a first radio access point in the access network infrastructure of the radio communication network with reception by a second radio access point in the access network infrastructure, wherein the first and second radio access points are configured to communicate with user equipment over a radio interface, wherein a first radio coverage area for the first radio access point is at least partially included in a second radio coverage area for the second radio access point;
    switching the first radio access point to an operating mode in which it does not transmit pilot signals;
    receiving, at the first radio access point, at least one of a random access request signal and a connection setup request intended for the second radio access point from at least one user equipment; and
    exiting the operating mode in which the first radio access point does not transmit pilot signals after receiving the at least one of the random access request signal and the connection setup request.

2. The method according to claim 1, wherein the random access request signal was received by the first radio access point from the at least one user equipment after having been transmitted by the corresponding user equipment toward the second radio access point.

3. The method according to claim 2, wherein the at least one user equipment identifies the second radio access point before transmitting the random access request signal toward the second radio access point.

4. The method according to claim 1, wherein the connection setup request was received by the first radio access point after having been transmitted by the at least one user equipment such that the corresponding connection setup request was at least intended for reception by the second radio access point.

5. The method according to claim 4, wherein the at least one user equipment identifies the second radio access point before transmitting the connection setup request for reception by the second radio access point.

6. The method according to claim 1, wherein the connection setup request was received by the first radio access point from the at least one user equipment and the first radio access point continues a connection setup procedure with the user equipment that initiated the corresponding connection setup request.

7. The method according to claim 1, wherein the connection setup request was received by the first radio access point from the at least one user equipment, the method further comprising:
    sending a connection response message from the first radio access point to the user equipment that initiated the corresponding connection setup request indicating the first radio access point intends to continue a connection setup procedure with the corresponding user equipment, wherein the user equipment that initiated the connection setup request abandons the corresponding connection setup procedure with the second radio access point.

8. The method according to claim 1, wherein the connection setup request was received by the first radio access point from the at least one user equipment and the user equipment that initiated the corresponding connection setup request continues a connection setup procedure with the first radio access point.

9. The method according to claim 1, wherein the connection setup request was received by the first radio access point from the at least one user equipment and the user equipment that initiated the corresponding connection setup request initiates a new connection setup procedure with the first radio access point.

10. The method according to claim 1, wherein the operating mode in which the first radio access point does not transmit pilot signals is an operating mode in which the first radio access point does not transmit any signal.

11. The method according to claim 1, wherein the radio communication network comprises a cellular radio communication network, wherein the first radio access point comprises a femto access point and the first coverage area comprises a femto cell, wherein the second radio access point comprises a macro base station and the second coverage area comprises a macro cell.

12. The method according to claim 1, wherein the first radio coverage area of the first radio access point is substantially fully included in the second radio coverage of the second radio access point.

13. The method according to claim 1, further comprising:
    acquiring reception parameters from the second radio access point at the first radio access point in conjunction with the synchronizing to enable the first radio access point to intercept random access request signals and connection setup requests intended for the second radio access point from user equipment located within the first radio coverage area.

14. A first radio access point, comprising:
    a radio interface configured for over-the-air communication with user equipment in a first radio coverage area associated with the first radio access point, wherein the first radio access point is configured for operation in an access network infrastructure of a radio communication network,
    a mode management processor configured to manage operating modes for the first radio access point, wherein the mode management processor is configured to control switchover to an operating mode in which the first radio access point does not transmit any pilot signals and departure from that operating mode,
    a radio controller configured to synchronize reception by the first radio access point with reception by a second radio access point in the access network infrastructure, wherein the second radio access point is configured for over-the-air communication with user equipment in a second radio coverage area associated with the second radio access point, wherein the first radio coverage area is at least partially included in the second radio coverage, and
    wherein the mode management processor is configured to switch the first radio access point to the operating mode in which it does not transmit pilot signals after reception of the first access point is synchronized with reception by said second radio access point;
    wherein the radio interface is configured to receive at least one of a random access request signal and a connection setup request intended for the second radio access point from at least one user equipment;
    wherein the mode management processor is configured to depart from the operating mode in which the first radio access point does not transmit pilot signals after receiving the at least one of the random access request signal and the connection setup request via the radio interface.

15. The first radio access point according to claim 14, wherein the connection setup request was received by the first radio access point from the at least one user equipment and the radio controller is also configured to continue a connection setup procedure with the user equipment that initiated the corresponding connection setup request.

16. The first radio access point according to claim 14, wherein the first radio access point comprises a femto access point and the first coverage area comprises a femto cell.

17. The first radio access point according to claim 16, wherein the radio communication network comprises a cellular radio communication network, wherein the second radio access point comprises a macro base station and the second coverage area comprises a macro cell.

18. The first radio access point according to claim 14, wherein the connection setup request was received by the first radio access point from the at least one user equipment and the radio controller is also configured to send a connection response message via the radio interface to the user equipment that initiated the corresponding connection setup request indicating the first radio access point intends to continue a connection setup procedure with the corresponding user equipment.

19. The first radio access point according to claim 14, wherein the operating mode in which the first radio access point does not transmit pilot signals is an operating mode in which the first radio access point does not transmit any signal.

20. The first radio access point according to claim 14, wherein the operating mode in which the first radio access point does not transmit pilot signals is an operating mode in which the first radio access point does not transmit signals via shared physical channels in a downlink direction.

21. A non-transitory computer readable medium storing program instructions that, when executed by a processor, cause a corresponding processor-controlled device to perform a method for managing the operation of a radio access point in an access network infrastructure of a radio communication network, the method comprising:
    synchronizing reception of a first radio access point in the access network infrastructure of the radio communication network with reception by a second radio access point in the access network infrastructure, wherein the first and second radio access points are configured to communication with user equipment over a radio interface, wherein a first radio coverage area for the first radio access point is at least partially included in a second radio coverage area for the second radio access point;

switching the first radio access point to an operating mode in which it does not transmit pilot signals;

receiving, at the first radio access point, at least one of a random access request signal and a connection setup request intended for the second radio access point from at least one user equipment; and exiting the operating mode in which the first radio access point does not transmit pilot signals after receiving the at least one of the random access request signal and the connection setup request.

* * * * *